(II-II)

Inventors:
HERBERT DRECHSEL, HUGO GRIMM
ATTORNEYS

United States Patent Office 3,164,446
Patented Jan. 5, 1965

3,164,446
MIXING DEVICE FOR MULTIPLE BED REACTOR
Herbert Drechsel and Hugo Grimm, both of Frankfurt am Main, Germany, assignors to Metallgesellschaft Aktiengesellschaft, Frankfurt am Main, Germany, a German corporation
Filed Sept. 6, 1961, Ser. No. 136,320
Claims priority, application Germany Sept. 8, 1960
9 Claims. (Cl. 23—288)

The present invention relates to an improvement in a reactor for the catalytic treatment of a gaseous substance in stages wherein an additional gaseous substance is introduced into the gaseous product resulting from catalytic treatment of said gaseous substance in a prior stage, and more particularly to a mixing means interposed in the reactor for mixing the gaseous product and an additional gaseous substance being supplied.

It is known to carry out an intermediate cooling between individual contact beds, usually between the first and second bed, of a multiple bed catalyst reactor for the conversion of $SO_2$-containing gases to $SO_3$, i.e. of preliminarily catalyzed gases by the addition thereto of cold $SO_2$-gas or cold air. For this purpose seamless pipes preferably of corrosion-resistant material such as stainless steel are employed, such pipes being provided with entrance openings or nozzles. Nevertheless, such seamless pipes have the disadvantage that the pressure introduction holes or openings for the cold gas easily become clogged whereby a uniform and thorough mixing of the gases, i.e. the preliminarily catalyzed gas and the added cooling gas, is no longer assured. It is also known to carry out the admixture of the cold gas to be introduced by means of a ceramic plate extending over the entire cross section of the catalyst bed reactor, said plate having a large number of mixing nozzles. While the advantage is attained that the ceramic material employed is not as expensive as corrosion-resistant metal, the ceramic material, even so, does not provide a construction wherein the uniform and thorough intermixing of the gases is any better than conventional pipes of the usual construction containing nozzle openings for the introduction of the gas being added.

It is an object of the present invention to overcome the foregoing drawbacks and to provide a mixing means interposed in a reactor for the catalytic treatment of a gaseous substance in stages wherein an additional gaseous substance is introduced into the gaseous product resulting from catalytic treatment of the gaseous substance in a prior stage, whereby the gaseous product and additional gaseous substance may be mixed in a favorable manner without clogging.

Figure 1:
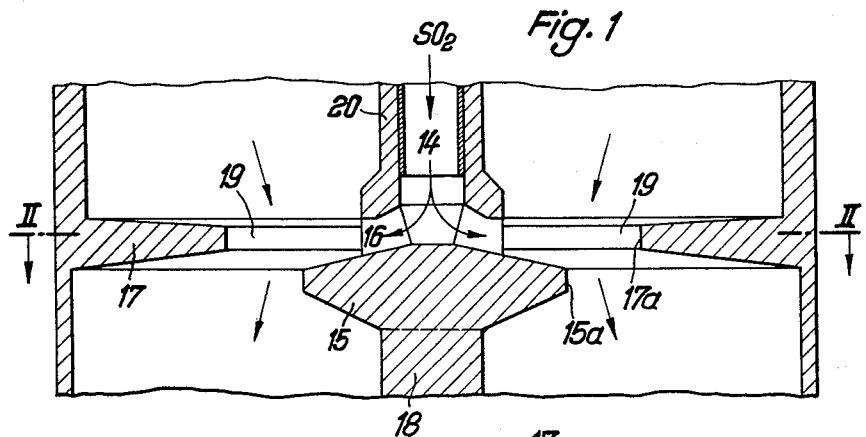
Figure 2:
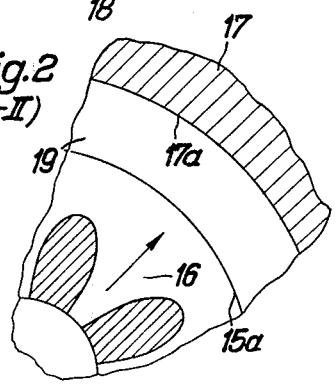
Figure 3:
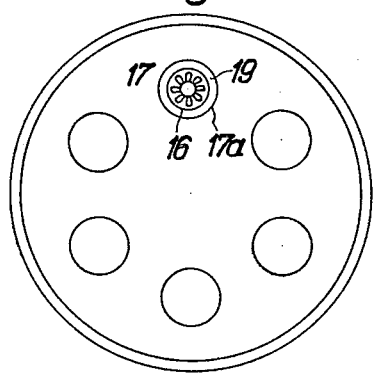
Figure 4:
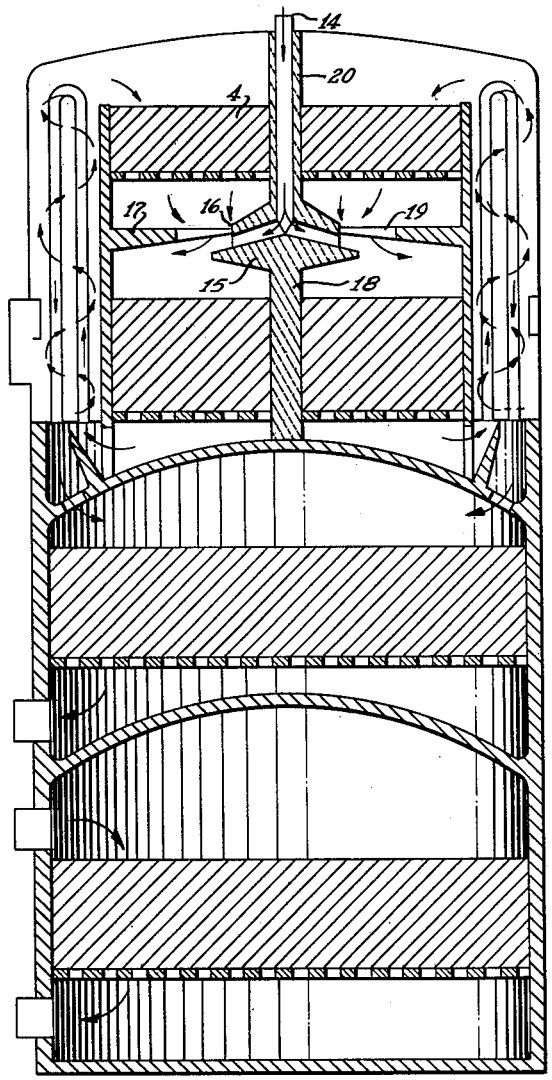

Other and further objects of the invention will become apparent from a study of the within specification and accompanying drawing in which, FIG. 1 is a partial schematic vertical sectional view of a portion of a reactor for the catalytic treatment of a gaseous substance in stages indicating constructional details of the mixing means for the hot and cold gases in accordance with the invention, FIG. 2 is a schematic enlarged partial view of a horizontal section through II—II of FIG. 1 looking down into a nozzle passage for the cold gas, in accordance with the invention, FIG. 3 is a plan view of a reactor wall provided with a plurality of mixing nozzles according to the invention, and FIG. 4 is a schematic sectional view of a reactor for the catalytic treatment of a gaseous substance in stages containing the mixing means of the invention.

It has been found in accordance with the present invention that an improved mixing means may be provided in a reactor for the catalytic treatment of a gaseous substance in stages wherein an additional gaseous substance is introduced into the gaseous product resulting from catalytic treatment of said gaseous substance in a prior stage. Specifically, the improvement relates to the interposing of a mixing means in the reactor for mixing the gaseous product and the additional gaseous substance, the mixing means including a central inlet for flow of one gaseous substance axially terminating in a multiple-opening nozzle, said nozzle having a plurality of substantially radially extending outwardly diverging passages, an annular ring for flow through of another gaseous substance having an inner edge radially spaced from the radially outermost ends of said passage to form an annular mixing chamber therebetween. Suitably, a radially extending convex surface defining an opposing deflecting or impinging member for gaseous substance is provided at the axial terminus of the central inlet, said convex surface further defining a portion of the radially extending nozzle passages. The convex surface terminates radially intermediate the outermost ends of the passages and the inner edge of the annular ring.

Preferably, the nozzle passages and the annular ring are positioned substantially at the same axial level. The annular ring actually forms a transverse wall having an opening defined therein, said wall being positioned within the reactor between two catalyst beds or stages of the multiple stage or multiple bed reactor. The annular ring thus extends radially outwardly to the wall of the reactor and is fixedly positioned thereon. In accordance with a preferred embodiment of the invention, the central inlet, nozzle, and deflecting member are integrally connected, and such parts may be made, for example, of ceramic material. For favorable results, the passages may be provided as arcuately diverging passages.

The deflecting member, whether or not integral with the central inlet and nozzle, may be positioned on a supporting stem at a point remote from the central inlet, and the deflecting member and stem may also be provided as integral.

Accordingly, it will be appreciated that the nozzle may be provided with a longitudinal conduit terminating in an open end portion while the deflecting member may be provided as a substantially transversely extending surface opposing the open end portion of the longitudinal conduit of the nozzle. A plurality of substantially laterally extending outwardly diverging passages defined between the conduit open end portion and the deflecting member may serve to form the nozzle openings. Thus, one gaseous substance issuing from the conduit may be deflected by the transversely extending surface and be passed laterally outwardly through the diverging passages forming the nozzle openings. A laterally extending wall member having an inside edge defining an aperture therein for flow of another gaseous substance therethrough is suitably provided such that the nozzle openings are disposed in the aperture and spaced from the adjacent edge of the wall member. The deflecting member is such that its outer edge extends laterally intermediate the nozzle openings and the adjacent edge of the wall member, whereby the wall member, nozzle openings, and deflecting member define therebetween a mixing chamber for said gaseous substances.

Advantageously, the present invention provides a device which permits an absolutely uniform intermixing of the added cold gases with the preliminarily catalyzed gases present in the multiple bed catalyst reactor, i.e. between the individual trays or stages of the reactor.

Referring to the instant drawing, cold $SO_2$ gas and/or cold air is centrally introduced via an inlet pipe 14 which may be made, for example, of stainless steel, appropriately surrounded by heat-resistant material for protection against the hot gases. The cold gas entering pipe 14 impinges against and is deflected by convex surface member 15, having the outer edges 15a, opposing the end of pipe 14. The convex surface member is in the form of a distributor mushroom mounted upon a stem support 18. While the heat-resistant material 20 surrounding pipe 14 and the convex surface member 15 may be preferably produced from ceramic material, and be integral with one another, the centrally positioned stem support 18 may be made either integral or not with member 15 (see FIGS. 1 and 4). The cold $SO_2$-containing gas and/or air is conducted through the outlet opening 16 (see FIG. 2) into the annular mixing space 19. Simultaneously, hot $SO_3$ containing gases pass downwardly through the opening 19 in vault or transverse ring-shaped wall 17 with the inner edge 17a of the reactor. As may be seen from FIGS. 1 and 2, opening or space 19 has an annular flow cross-sectional area substantially larger than that of the central inlet or pipe 14. In this manner, an effective and thorough intermixing takes place in the simplest manner with no danger of any clogging or non-uniform impacting of individual or local places of the entire cross section of the intermixing chamber as was the case heretofore.

It will be appreciated, from a study of FIGS. 1 and 2, that nozzle openings 16 are provided in radial arrangement at the lower end of pipe 14, the openings 16 radially outwardly diverging into the annular space 19. Of course, the lateral walls defining the flow passages of openings 16 serve to interconnect, integrally if desired, the lower end of pipe 14, or more clearly, the lower end of the surrounding ceramic pipe wall 20, with the convex surface of member 15. A concentric intermixing chamber is thus provided in accordance with the invention which permits the flow of hot $SO_3$-containing gases to be intermixed by the radially outwardly flowing cold $SO_2$-containing gases and/or air in a simple and efficient manner avoiding clogging and local non uniform reactions from taking place.

It will be appreciated that in the classical oxidation of $SO_2$-containing gases to form $SO_3$, using catalysts such as vanadium catalysts, multiple bed reactors are employed within which the operating temperatures must be maintained within comparatively narrow limits. The temperature for the oxidation in accordance with the multiple bed technique will depend partially upon the degree of concentration of the $SO_2$ and partially upon the type of catalyst used. Temperatures between about 420 and 450 degrees C. are often employed for this purpose. Specifically, while the initial temperature of the gas passing through the first catalyst bed may be between these limits, the temperature should be maintained as low as possible at the last bed of the series of multiple beds in the reactor in order to avoid an undesirable shift in equilibrium causing $SO_3$ dissociation which would otherwise occur with increased temperatures. Generally, the first bed of the series may be operated at a somewhat higher temperature than the minimum limit in order to obtain favorable reaction speeds.

Naturally, during the course of the gas through the reactor beds, the temperature increases and for this reason heat exchange means must be provided to reduce the temperature in order to keep the same within the prescribed limits. Often, provision is made for employing reaction heat regeneratively to heat the incoming gas to a suitable initial temperature, and especially to pre-heat the incoming comparatively cold $SO_2$-containing gas by heat exchange with the hot gases produced in the reactor.

A tubular vertically positioned reactor (see FIG. 4) may be used in accordance with the invention having a series of successively connected compartments therealong, each containing a catalyst bed of the type shown at 4. The nozzle-mixing chamber arrangement of the invention is disposed between the firstmost, e.g. uppermost, bed compartment and the second catalyst bed compartment situated immediately therebelow but may also be interposed between successive stages. Specifically, horizontal wall or vault 17 separates these two compartments and permits the flow of $SO_2$ laden gas from the first compartment to the second compartment for the further oxidation of $SO_2$ contained in the gas to $SO_3$. Of course, at this point further cold $SO_2$-containing gas is introduced through pipe 14 and mixes with the $SO_2$ and $SO_3$ laden gas flowing through opening 19 from the first, e.g. upper bed compartment to the second, e.g. lower bed compartment. Further stage compartments may be situated in the lower portion of the vertical reactor, whereby the progressive conversion of $SO_2$ in the gas to $SO_3$ is carried out.

Since the temperature along the series of compartments containing the catalyst beds must be maintained, in each instance, within specified limits, suitable heat exchange means may be interposed in the flow path of the reaction gases between successive compartments. It will be appreciated, however, that the cold $SO_2$-containing gas introduced into the annular space 19 via pipe 14 is maintained out of flow communication with the reactor and the compartments up to the point where the gas issues from passages 16.

For larger reactors with a twenty-four hour daily capacity of 150–1000 tons of $H_2SO_4$ with a diameter of six meters and more, it is advantageous to employ a plurality of such nozzle and deflecting devices 14, 15, 16, arranged at substantially the same level within a single mixing chamber 19, as shown in FIG. 3.

Further explanation of various features of a multiple bed reactor as contemplated by the present invention may be had with reference to our co-pending U.S. application Serial No. 136,305, filed September 6, 1961, entitled "Multiple Bed Reactor."

What is claimed is:

1. In a reactor for the catalytic treatment of a gaseous substance in stages wherein an additional gaseous substance is introduced into the gaseous product resulting from catalytic treatment of said gaseous substance in a prior stage, the improvement which comprises at least one mixing means interposed in said reactor for mixing said gaseous product and said additional gaseous substance, said mixing means including a central inlet of predetermined flow-cross sectional area for flow of one gaseous substance axially terminating in a multiple-opening nozzle, said nozzle having a plurality of substantially radially extending outwardly diverging passages, an annular ring for flow through of another gaseous substance having an inner edge radially spaced from the radially outermost ends of said passages to form an annular mixing chamber therebetween, and a radially extending convex surface defining an opposing deflecting member for gaseous substance, said convex surface being spaced axially from the axial terminus of said central inlet and further defining the portion of said radially extending nozzle passages axially remote from such axial terminus of said central inlet; said convex surface terminating radially intermediate the outermost ends of said passages and the inner edge of said annular ring to provide an annular flow cross-sectional area thereat between the radial terminus of said convex surface and the inner edge of said annular ring substantially larger than the flow cross-sectional area of said central inlet.

2. Improvement according to claim 1 wherein said nozzle passages and said annular ring are positioned substantially at the same axial level.

3. Improvement according to claim 1 wherein said annular ring extends radially outwardly to the wall of the reactor and is fixedly positioned thereon.

4. Improvement according to claim 1 wherein said central inlet includes a central metal inlet pipe surrounded by a substantially axially coextensive wall of heat-resistant material and wherein such heat-resistant wall, said nozzle and said deflecting member are integral.

5. Improvement according to claim 4 wherein said heat-resistant wall, said nozzle and said deflecting member are made of ceramic material.

6. Improvement according to claim 1 wherein said passages are arcuately diverging passages.

7. Improvement according to claim 1 wherein said deflecting member is positioned on a supporting stem at a point remote from said central inlet.

8. Improvement according to claim 7 wherein said deflecting member and stem are integral.

9. In a reactor for the catalytic treatment of a gaseous substance in stages wherein an additional gaseous substance is introduced into the gaseous product resulting from catalytic treatment of said gaseous substance in a prior stage, the improvement which comprises at least one mixing means interposed in said reactor for mixing said gaseous product and said additional gaseous substance, said mixing means including a nozzle having a longitudinal tubular conduit of unobstructed contiguous flow cross-section terminating longitudinally in an open end portion, a substantially transversely extending surface spaced longitudinally from said open end portion at the longitudinal terminus of said conduit and defining an opposing deflecting member for one gaseous substance issuing from said conduit, a plurality of substantially laterally extending outwardly diverging passages defined in the axial space between said conduit open end portion and said deflecting member to form nozzle openings, and a laterally extending wall member having an inside edge defining an aperture therein for flow of another gaseous substance therethrough, said nozzle openings being disposed in said aperture and spaced from the adjacent edge of said wall member, said deflecting member having an outer edge extending laterally intermediate the nozzle openings and the adjacent edge of the wall member, said wall member, nozzle openings and deflecting member defining a mixing chamber therebetween for said gaseous substances.

References Cited in the file of this patent
UNITED STATES PATENTS

| | | |
|---|---|---|
| 1,321,358 | Beck | Nov. 11, 1919 |
| 1,821,956 | Yee | Sept. 8, 1931 |
| 2,399,560 | Murphree | Apr. 30, 1946 |
| 2,438,242 | Watson | Mar. 23, 1948 |
| 2,846,291 | Johannsen et al. | Aug. 8, 1958 |